United States Patent [19]

Webb et al.

[11] Patent Number: 6,133,932
[45] Date of Patent: Oct. 17, 2000

[54] METHOD AND APPARATUS FOR ADJUSTING A LINE SYNCHRONIZATION SIGNAL IN RESPONSE TO PHOTORECEPTOR MOTION

[75] Inventors: Douglas E. Webb, Fairport; Charles J. Mirabella, Jr., Rochester; Robert Mara, Fairport; Charles E. Smith, Pittsford, all of N.Y.

[73] Assignee: Xerox Corporation, Stamford, Conn.

[21] Appl. No.: 08/358,490

[22] Filed: Dec. 19, 1994

[51] Int. Cl.$^7$ ........................................................ B41J 2/06
[52] U.S. Cl. ............................................................. 347/232
[58] Field of Search ...................................... 347/240, 237, 347/232, 248, 234

[56] References Cited

U.S. PATENT DOCUMENTS

| | | |
|---|---|---|
| 4,514,739 | 4/1985 | Johnson et al. . |
| 4,611,901 | 9/1986 | Kohyama et al. . |
| 4,660,059 | 4/1987 | O'Brien . |
| 4,807,156 | 2/1989 | Parisi . |
| 4,809,020 | 2/1989 | Agulnek .................................... 342/232 |
| 4,833,503 | 5/1989 | Snelling . |
| 4,837,636 | 6/1989 | Daniele et al. . |
| 4,903,067 | 2/1990 | Murayama et al. . |
| 5,043,744 | 8/1991 | Fantuzzo et al. . |
| 5,153,644 | 10/1992 | Yang et al. . |
| 5,278,587 | 1/1994 | Strauch et al. . |
| 5,278,625 | 1/1994 | Charnitski et al. . |
| 5,287,125 | 2/1994 | Appel et al. . |
| 5,287,160 | 2/1994 | Dastin et al. . |
| 5,287,162 | 2/1994 | de Jong et al. . |
| 5,300,962 | 4/1994 | Genovese . |
| 5,319,393 | 6/1994 | Genovese . |
| 5,381,165 | 1/1995 | Lofthus et al. ........................... 347/232 |

*Primary Examiner*—John Barlow
*Assistant Examiner*—Raquel Yvette Gordon
*Attorney, Agent, or Firm*—Duane C. Basch; Paul F. Daebeler

[57] ABSTRACT

The present invention is a method and apparatus for modifying line synchronization signals that drive at least one secondary image exposure device in a multicolor printing or reprographic system. The ability to alter the line synchronization signals enables the accurate registration of a multiple color images on a photoconductor in response to detected photoreceptor motion. More specifically, the first color image is deposited on the photoreceptor using a servomotor control system to control photoreceptor velocity as a function of the desired raster line spacing, or the frequency at which the individual raster lines are deposited. All subsequently added colors in the single-pass printing system are added under the control of phase-locked loops, wherein the line synchronization pulses are produced as a function of the photoreceptor speed, to correct for variations from the nominal photoreceptor velocity.

15 Claims, 8 Drawing Sheets

METHOD AND APPARATUS FOR ADJUSTING A LINE SYNCHRONIZATION SIGNAL IN RESPONSE TO PHOTORECEPTOR MOTION

CROSS REFERENCE

The following related patent and patent application are hereby incorporated by reference for their teachings:

"Method and Apparatus for Correction of Color Registration Errors," J. de Jong et al., U.S. Pat. No. 5,287,162, filed Jun. 16, 1992; and "Method to Provide Optimum Optical Contrast for Registration Mark Detection," V. Castelli et al., Application Ser. No. 08/168,300, filed Dec. 17, 1993.

This invention relates generally to a method and apparatus for adjusting a line synchronization signal in response to photoreceptor motion, and more particularly to modifying the control signals which drive a secondary image exposure device to enable the accurate registration of multiple color images on a photoconductor in response to photoreceptor motion error.

BACKGROUND AND SUMMARY OF THE INVENTION

In an electrophotographic printing system, a photoconductive member is typically charged to a substantially uniform potential to sensitize the surface thereof. The charged photoconductive member is then exposed to a light image. Exposure of the charged photoconductive member selectively dissipates the charges thereon in the irradiated areas This exposure process produces or "records" an electrostatic latent image on the photoconductive member corresponding to informational areas within the document being printed. After the electrostatic latent image is recorded on the photoconductive member, the latent image is developed by bringing developer material into contact therewith. Toner particles from the developer material are attracted to the electrostatic latent image at a development station to develop a toner powder image that is subsequently transferred from the photoconductive member to a substrate sheet. The toner particles on the substrate sheet are then heated to permanently affix the powder image thereon.

The foregoing generally describes a typical single color electrophotographic printing system. With the advent of multicolor electrophotography (including highlight-color (typically one color plus black) and full-color output), it is desirable to use single-pass architectures that comprise a plurality of image forming stations (including tandem or image-on-image architectures) arranged in seriatim as described, for example, in U.S. Pat. No. 5,300,962 to Genovese, issued Apr. 5, 1994. The single-pass architecture offers a significant potential for increased throughput and improved image quality.

As is well known, image registration is an important and difficult problem in a xerographic color image printing system. Generally, multiple color separations are produced on a common photoreceptor or intermediate member so as to coincide with one another and produce a full color image, for example, as found in the Xerox® 4850 or 4890 Highlight Color Printing Systems. Subsequently, the color image is transferred to paper and fixed thereon. Alternatively, in lieu of an intermediate belt or photoreceptor a copy sheet transport or conveyor may be employed so that the color separations are transferred directly to the delivery medium.

In order to deliver quality images, strict specifications are imposed on the accuracy with which the various color separations that compose the individual images are exposed. In highlight color systems, the juxtaposition accuracy, often referred to as image registration, typically must be maintained within a 125 $\mu$m (micrometers) range and preferably is less than 75 $\mu$m, where the range represents the diameter of a circle that would encompass all homologous color dots. In process color systems the required juxtaposition accuracy is on the order of 25 $\mu$m or less and preferably about 10 $\mu$m. Furthermore, some imaging techniques require registration accuracy on the order of about 15 $\mu$m for pictorial information.

Color printers that employ registration marks produced by each of the constituent colors in juxtaposition with each other enable correction of lateral and longitudinal relative position, skew and magnification. The marks may be machine readable, and data may be processed to measure registration errors for the purpose of automating registration error correction. Measurement of the position of each of the registration marks may be accomplished by illuminating the marks and employing a lens to collect the diffusely reflected light to image the reflection on photodetectors or photodetector arrays. The illumination may be in the visible wavelength or at near infrared (IR) wavelength. In order to reliably detect the position of the registration mark, the diffuse reflection from the registration mark must be significantly different from its background. It is desirable therefore, to achieve high contrast for bright or black belts and for image output terminals (IOTs) for which the first printed color has high or low diffuse reflectivity.

The present invention is directed toward methods and apparatus for employing registration error distributions measured with sufficient spatial resolution by sensors, and from such registration error distributions, compensating for photoreceptor velocity so as to eliminate motion errors that are typically repeatable in amplitude and phase.

Heretofore, a number of patents and publications have disclosed methods and apparatus for adjusting the position of raster scanning beams in response to photoreceptor motion, the relevant portions of which may be briefly summarized as follows:

U.S. Pat. No. 4,903,067 to Murayama et al., issued , discloses a marking system with a detector for measuring alignment errors and then mechanically moving individual color printers to correct misalignment.

A number of patents describe methods for adjusting the position or intensity of individual light beams so as to compensate for changes in the photoreceptor motion, including: U.S. Pat. No. 4,514,739 to Johnson et al., issued Apr. 30, 1985; U.S. Pat. No. 5,319,393 to Genovese, issued Jun. 7, 1994; U.S. Pat. No. 5,287,125 to Appel et al., issued Feb. 15, 1994.

U.S. Pat. No. 5,287,160 to Dastin et al., issued Feb. 15, 1994, discloses a color printer employing various motion components having circumferences that are either multiples or submultiples of a predetermined pitch distance Any systematic error due to motion of the components is repeated identically for each color separation, thereby eliminating misregistration for the plurality of color separations.

U.S. Pat. No. 5,287,162 to de Jong et al., issued Feb. 15, 1994, teaches a detection system for applying chevron marks deposited at sequential printers so as to detect motion error and correct therefor.

U.S. Pat. No. 5,043,744 to Fantuzzo et al., issued Aug. 27, 1991, discloses a raster output scanner (ROS) wherein the velocity of the imaging member is controlled as a function of the position of the imaging beam, and where the tilt of the beam is adjusted relative to the imaging member.

U.S. Pat. No. 4,807,156 to Parisi, issued Feb. 21, 1989, teaches an improved control for adjusting the size of an image printed by a printer, where the length (process direction) of an image on the photoreceptor may be adjusted using a cycle stealing component. The cycle stealing component periodically, in response to a predetermined algorithm based upon desired magnification, delays the signal used to drive polygon rotation in the raster scanner.

U.S. Pat. No. 5,153,644 to Yang et al., issued Oct. 6, 1992, discloses a dual-mode correction system for compensating for both vibratory and photoreceptor motion errors in a xerographic printing apparatus. An encoder is employed to sense both photoreceptor speed and relative vibration between the phtotoreceptor and the imaging device. The signal produced by the encoder is then processed to obtain high and low frequency error signals. The low frequency signals are applied to correct photoreceptor motion error, while the high frequency signals are used to control a beam wobble correcting element in the imaging device.

U.S. Pat. No. 4,837,636 to Daniele et al., issued Jun. 6, 1989, teaches a xerographic copying/printing machine wherein the photoreceptor speed is sensed using a plurality of equally spaced holes along an edge thereof, the holes being sensed by a charge coupled device in response to light shining through the holes. The monitoring system employed is used for timing the recording member in order to generate clock signals for use in maintaining the operating speeds of related machine components in synchronization with the recording member despite changes in recording member speed.

U.S. Pat. No. 5,278,587 to Strauch et al., issued Jan. 11, 1994 discloses a method of registering images on a photoreceptor belt so as to form sequential images in a single pass. A pair of transversely aligned belt holes, in conjunction with associated light detectors, are used to position the ROS exposed images on the photoreceptor belt.

U.S. Pat. No. 5,278,625 to Charnitski et al., issued Jan. 11, 1994 teaches a LED-based, single-pass imaging system employing an improved lateral registration system. An LED print bar control system establishes an initial registration for each print bar and subsequently maintains the registration within tolerance by detecting relative lateral motion between the print bar and the photoreceptor.

In accordance with the present invention, there is provided a multiple-image registration apparatus in a printing system for synchronizing the output of a plurality of imaging stations with respect to a member moving relative to the imaging stations, comprising:

a servomotor for driving the member;

a first imaging station, located along the periphery of the member, for producing a first transferable image on a surface of the member, said first imaging station producing rasterized lines of the first image at a fixed line frequency on the surface of the member in response to data of a first color separation;

a first velocity sensing means, positioned adjacent the first imaging station and in contact with the member, for sensing the velocity of the member as it passes said first imaging station and producing an electrical signal representative thereof;

a first phase-locked loop controller for receiving the electrical signal from the first encoder and a signal representing the fixed line frequency, said first phase-locked loop creating a servomotor drive signal as a function of the electrical signal and fixed frequency signal so as to cause the servomotor to drive the member in synchronization with said first imaging station;

a second imaging station, located along the periphery of the member downstream from said first imaging station, for producing a second transferable image on the member, said second imaging station producing rasterized lines of the second image in response to a second scanline clock signal;

a second velocity sensing means, positioned adjacent the second imaging station and in contact with the member, for sensing the velocity of the member as it passes said second imaging station and producing a second electrical signal representative thereof; and a second phase-locked loop controller for receiving the second electrical signal and creating the second scanline clock signal as a function of the second electrical signal so as to cause the second imaging station to produce rasterized lines of the second image on the member in registration with the rasterized lines of the first image in response to data of a second color separation.

In accordance with another aspect of the present invention, there is provided a method for synchronizing the output of a plurality of imaging stations in a single-pass, multi-color printing system comprising the steps of:

driving, with a servomotor, a photoresponsive member in a process direction relative to the plurality imaging stations;

producing, at a first imaging station, located along the periphery of the photoresponsive member, a first transferable image on the surface of the photoresponsive member, the first image comprising rasterized lines at a fixed frequency;

sensing the speed of the photoresponsive member as it passes the first imaging station and producing an electrical signal representative thereof;

creating, as a function of the electrical signal and a signal representing the fixed frequency, a servomotor drive signal to drive the photoresponsive member in synchronization with the production of the rasterized lines of the first transferable image at the first imaging station;

producing, at a second imaging station located along the periphery of the photoresponsive member and spaced apart from said first imaging station in the process direction, a second transferable image on the surface of the photoresponsive member, the second image comprising rasterized lines produced in response to a scanline clock signal;

sensing the speed of the photoresponsive member as it passes the second imaging station and producing a second electrical signal representative thereof; and creating the scanline clock signal as a function of the second electrical signal to synchronize the second imaging station to produce rasterized lines of the second image on the photoresponsive member in registration with the rasterized lines of the first image.

In accordance with yet another aspect of the present invention, there is provided a multi-color printing machine having a movable recording member, including:

a first imaging station, located along the periphery of the recording member, for producing a first transferable image on a surface of the recording member, said first imaging station producing rasterized lines of the first image at a fixed line frequency on the surface of the recording member;

a servomotor for driving the recording member;

a first encoder, positioned adjacent the first imaging station and in contact with an opposite surface of the recording member, for sensing the speed of the recording member as it passes said first imaging station and producing an electrical signal representative thereof;

a first phase-locked loop controller for receiving the electrical signal from the first encoder and a signal representing the fixed line frequency, and creating therefrom a servomotor drive signal as a function of the electrical signal and the fixed frequency signal so as to control the speed of the servomotor and thereby drive the recording member in synchronization with said first imaging station;

a second imaging station, located along the periphery of the recording member yet spaced apart from said first imaging station in the direction of travel of the recording member, for producing a second transferable image on the recording member, said second imaging station producing rasterized lines of the second image in response to a scanline clock signal;

a second encoder, positioned adjacent the second imaging station and in contact with the opposite surface of the recording member, for sensing the speed of the recording member as it passes said second imaging station and producing a second electrical signal representative thereof;

a mark detector for generating a mark detection signal upon detection of a mark placed on the surface of the member by said first imaging station;

a second phase-locked loop controller for receiving the second electrical signal and creating the scanline clock signal as a function of the second electrical signal and the fixed frequency signal so as to cause the second imaging station to produce rasterized lines of the second image on the recording member at a spatial separation equal to that of the rasterized lines of the first image; and a mark detect counter, responsive to the mark detection signal, for delaying the output of the second imaging station for a predetermined period subsequent to receiving the mark detection signal so as to produce the second image on the surface of the member in registration with the rasterized lines of the first image.

An object of the present invention is to assure that the photoreceptor drive velocity is locked to the imaging frequency, particularly the rotation speed of a polygon employed in a raster scanning device, and that the velocity can be easily calibrated without regard for photoreceptor drive and encoder roll diameters or tolerances. A second object of the present invention is to employ marks on the photoreceptor, either permanent or xerographically deposited and associated with each image or pitch position, to provide accurate image registration for each color separation. A third object of the present invention is to assure that the raster line rates (frequencies) and the phases of the rasters produced by the second and subsequent imaging stations are in registration with respect to the first image deposited.

One aspect of the invention deals with a basic problem in multicolor image registration, where in order to deliver quality images, strict specifications are imposed on the accuracy with which the various color separations that compose the individual images are registered on a photoreceptor or similar imaging member. This invention is further based on the discovery of a phase-locked loop technique that alleviates this problem. The technique not only synchronizes the imaging of a first color image to the speed of the photoreceptor, but also controls and synchronizes the imaging rate of any subsequent color separations as a function of photoreceptor position (distance travelled) and the imaging rate of the first imaging station so as to assure accurate registration between the first and subsequent scanlines and color separations. The technique described above is advantageous because it does not rely on mechanical or optical mechanisms to alter the position of the subsequent image separations, but handles the alteration by electronically altering the timing of the image creation (e.g., exposure). Accordingly, the technique described accomplishes accurate multicolor image registration without the need for additional mechanical hardware.

Figure 1:
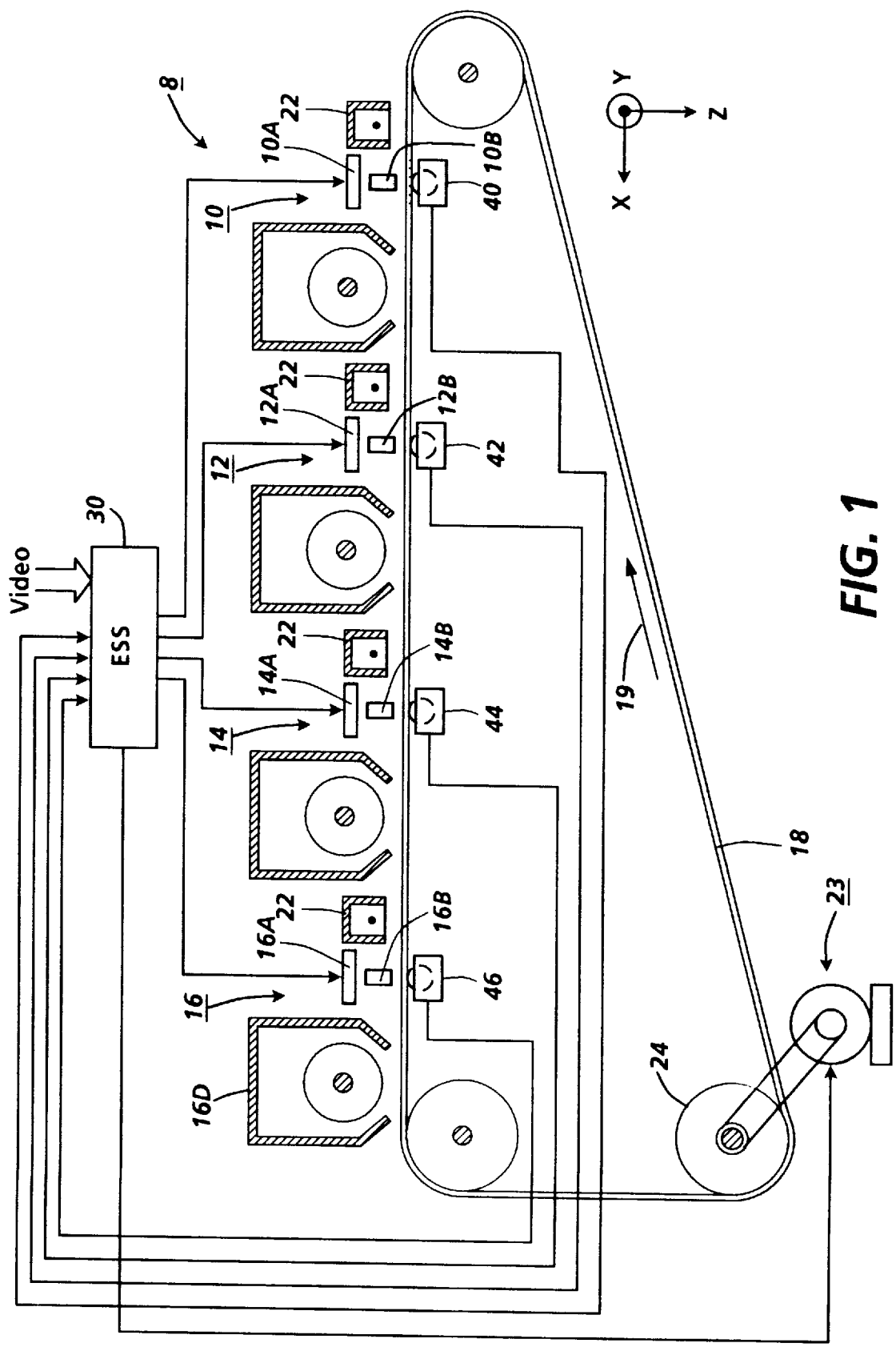
FIG. 1 is an elevational view of a xerographic system in a single-pass color printer in which the present invention finds particular use.

The present invention will be described in connection with a preferred multicolor printing embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "signal" refers herein to a physical signal that indicates or includes information. "Circuitry" or a "circuit" is any physical arrangement of matter that can respond to a first signal at one location or time by providing a second signal at another location or time. Circuitry "transfers" a first signal when it receives the first signal at a first location and, in response, provides substantially the same signal at a second location. A processor or other component of circuitry "operates on" an item of data or a signal by performing an operation that includes obtaining a resulting item of data, or producing a signal, that depends on the item of data operated on. For example, the resulting item of data could result from an operation that accesses the item of data operated on or from a logic or arithmetic operation on the item of data operated on.

Any two components are "connected" when there is a combination of circuitry that can transfer signals from one of the components to the other. For example, two components are "connected" by any combination of connections between them that permits transfer of signals from one of the components to the other. Similarly, two or more components are "interconnected" when each component is connected to every other component through some combination of connections.

A "line" is a simple conductive component that extends between and connects two or more components. In an integrated circuit, leads of two components may also be "connected" by being formed as a single lead that is part of both components.

"Control circuitry" is circuitry that provides data or other signals that determine how other components operate. For example, "instruction circuitry" is control circuitry that provides items of data indicating instructions to a component that includes processing circuitry.

An "image" is a pattern or arrangement of marks, marking particles, or electrical charges on a surface. Moreover, an image may be represented as a plurality of signals representing pixels thereof, wherein the signals may be used to produce the image in a human readable form. An "image station" is an apparatus or assembly suitable for depositing, exposing and/or developing an image on a surface. For example, an imaging station may be simply a raster scanning device or similar exposure mechanism suitable for creating a pattern of altered charge on a charged photoconductor. An "imaging station" may further include development apparatus so as to develop the charge pattern on the photoconductor surface with marking particles, or toner, in order to produce a transferable image thereon. An "image output device" is a device that can provide output defining an image and specifically includes printing systems or any other structure capable of defining an image on a removable medium.

Turning to FIG. 1, depicted therein is a schematic representation of a single-pass, multicolor printing system 8 having four exposure stations, 10, 12, 14, and 16. Each exposure station includes a light-emitting diode (LED) print bar, 10A, 12A, 14A, and 16A, respectively. Each print bar is selectively addressed by a video image signal processed through electronic subsystem (ESS) controller 30, to produce a modulated output that is coupled through a gradient index lens array 10B, 12B, 14B and 16B, to the surface of a charged photoreceptor member 18, preferably a belt. In the LED print bar imaging station embodiment depicted in FIG. 1, the print bars comprise a linear array of light emitting elements that, when addressed, expose images on photoreceptor belt 18 at a 600 spot/inch (spi) resolution (or another predefined spatial resolution).

Figure 2:
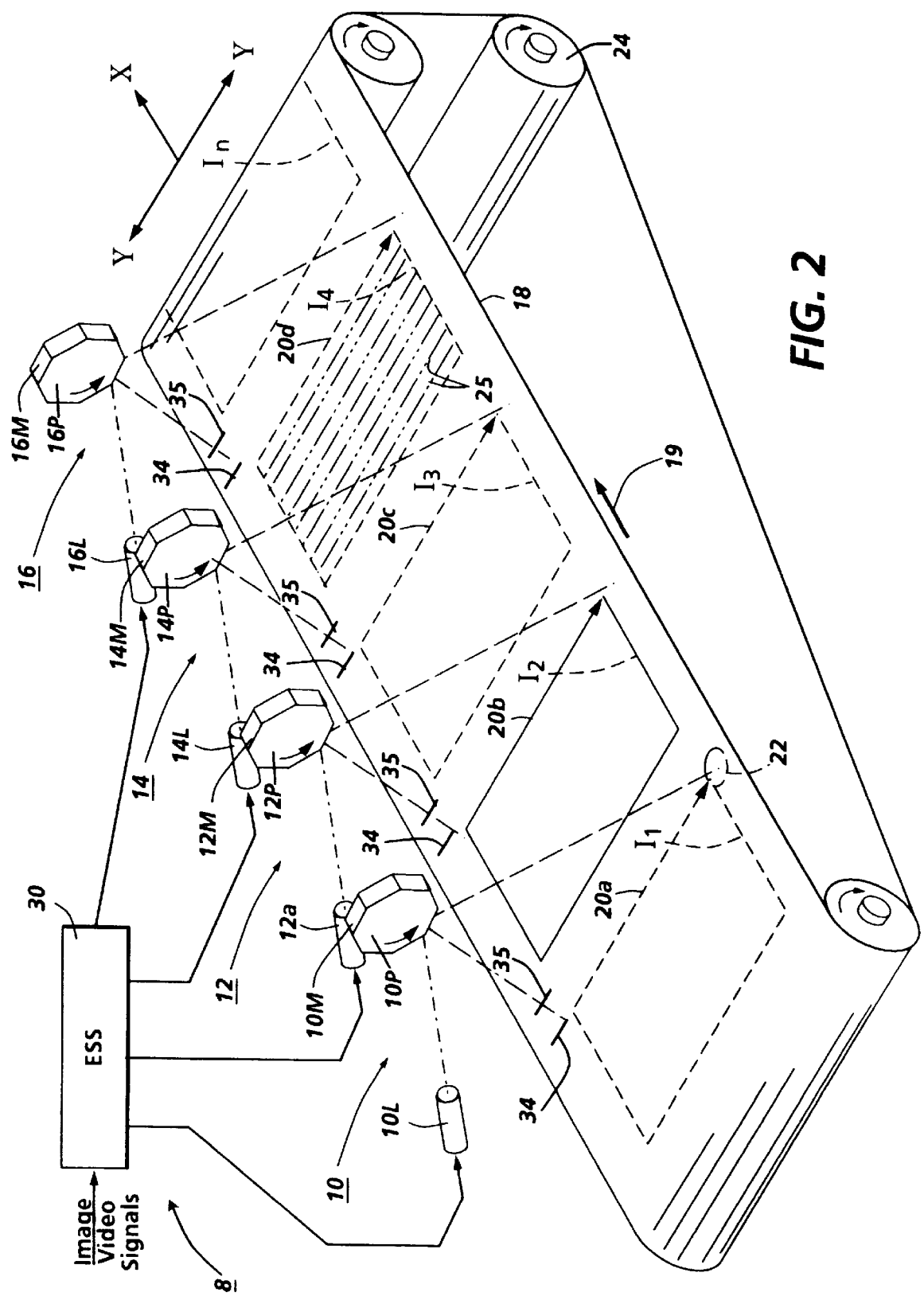
FIG. 2 is a schematic perspective view of an alternative single-pass color printer in which the present invention finds particular use.

Alternatively, the single pass, color printing system 8 may employ four raster output scanning (ROS) systems at the imaging stations, 10, 12, 14, and 16, as reflected by FIG. 2. In the ROS imaging station configuration, exposure of the photoreceptor belt 18 is accomplished using conventional scanning components, of which only two, the laser light sources 10L, 12L, 14L, and 16L, and the rotating polygon mirrors 10M, 12M, 14M, and 16M, are shown. The particular ROS imaging stations depicted in FIG. 2 have a gas, or preferably, laser diode (e.g., 10L), whose output is modulated by signals from ESS 30 and optically processed as a focused line on the facets of rotating polygon 10M. Each facet reflects the modulated incident laser beam as a scan line that is focused along a transverse path at the photoreceptor surface. ESS 30 contains not only the circuit and logic modules which respond to image video signals, but other circuitry for operating the photoreceptor drive synchronously with the first imaging station and to control the rotation of the polygons 12P, 14P and 16P by polygon motors (not shown) as will be hereafter described in detail. Further details of charge and development xerographic stations in a multiple exposure single pass system are well-known and disclosed, for example, in U.S. Pat. Nos. 4,660,059, 4,833,503 and 4,611,901, the relevant portions of which are hereby incorporated by reference.

Referring now to FIGS. 1 and 2, the length of belt 18 is preferably designed to accept a number of spaced image areas $I_1$–$I_n$ represented by dashed line rectangles in FIG. 2. Image areas $I_1$–$I_4$ comprise an image frame; it is understood additional image frames, each associated with a process color image may be formed during one belt rotation. Upstream of each of the image areas $I_1$–$I_4$ is a charging station 22 which places a predetermined electrical charge on the surface of belt 18. As each of the image areas $I_1$–$I_4$ reaches a transverse start-of-scan line, represented by lines 20a–20d, the area is progressively exposed on closely spaced transverse raster lines 25, shown with exaggerated longitudinal spacing on the image area $I_4$. Each image area $I_1$–$I_4$ is exposed successively by imaging stations 10, 12, 14 and 16. While illustrated with respect to multicolor embodiments capable of producing at least four color images, it is understood that the present invention has particular application to highlight color (one color plus black) printing systems as well, where accurate registration of the two image separations is also required Downstream from each imaging station, developers 10D, 12D, 14D, and 16D develop the latent image formed in the preceding image area as a result of the exposure of photoreceptor belt 18. A fully developed color image is then transferred to an output sheet (not shown). Details of charge and development xerographic stations in a multiple exposure single pass system are disclosed, for example, in U.S. Pat. Nos. 4,660,059, 4,833,503 and 4,611,901, previously incorporated herein by reference. The charge, development and subsequent image transfer operations (not shown) are conventional in the art.

In a single pass, full color operation, belt 18 is driven in the process direction (x-direction) by servomotor 23 connected to drive roll 24. As illustrated in FIG. 1, the servomotor receives signals from ESS 30 to control the speed of the photoreceptor belt 18. ESS 30, as described herein, includes the phase-locked loop control circuitry described with respect to FIG. 5. As the image area $I_4$ passes beneath first imaging station 10, a first image is produced on the surface of the member 18 as described above. More specifically, under the control of ESS 30, the first imaging station, or more accurately the first exposure device (LED or ROS), exposes on the surface of photoreceptor belt 18 a plurality of rasterized image lines at a fixed frequency. The frequency of the line exposure in the present embodiment preferably results in a line resolution of 600 lines/inch (lpi), however, other desired resolutions are possible. In order to achieve the desired line resolution, the speed of the photoreceptor must be accurately controlled as a function of the exposure frequency. For example, in the ROS embodiment of FIG. 2, the speed of the ROS polygon 10M would dictate the photoreceptor speed necessary to obtain the desired resolution in accordance with the following equation:

$$L = f_0/V \qquad (1)$$

where L is the desired line spacing, $f_0$ the frequency of the line synchronization (line sync) signals supplied to drive the polygon (or the LED array of FIG. 1) and V the surface speed of the photoreceptor. Assuming a desired resolution (L) of 600 lpi and a line sync frequency ($f_0$) of approximately 13,346 cycles/second, the required photoreceptor speed is approximately 22.24 inches/second (0.565 meters/second). If the speed is monitored by an encoder having a resolution of 1024 pulses/rotation and a contacting wheel or roll with a diameter of approximately 0.98 inches (25 millimeters), the output frequency of the signal generated by the encoder should be approximately 7,366 pulses/second. As illustrated in FIG. 1, the speed of the photoreceptor is preferably monitored at locations adjacent imaging stations 10, 12, 14 and 16 by encoders positioned beneath, or inside, the photoreceptor belt by encoders 40, 42, 44 and 46, respectively The encoders are preferably optical disk type encoders having a resolution of at least 1024 pulses/revolution. Alternatively, laser doppler velocimeters, magnetic encoders and other equivalents might be employed in place of the optical encoders. While an encoder frequency is normally sufficient to control the operation of the servomotor 22, using a feedback loop, the present invention employs a phase-locked loop control architecture as generally depicted in FIG. 3, whereby the photoreceptor position, or more accurately the position of the images exposed and developed thereon, may be accurately controlled to assure proper registration.

Figure 3:
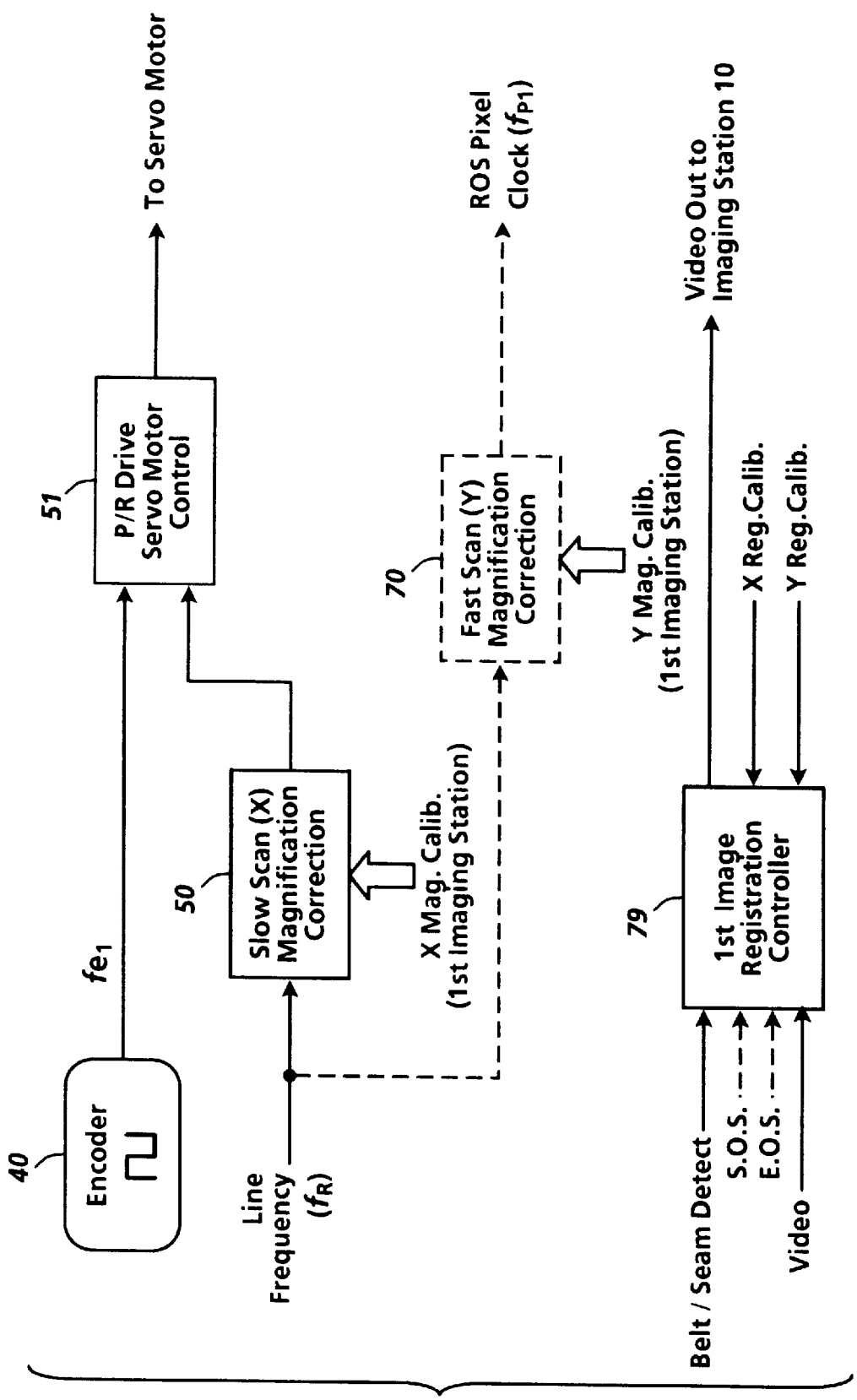
FIGS. 3 and 4 are general block diagrams illustrating a control architecture to accomplish process direction registration of the color separations in an image-on-image color system in accordance with the present invention.
Figure 4:
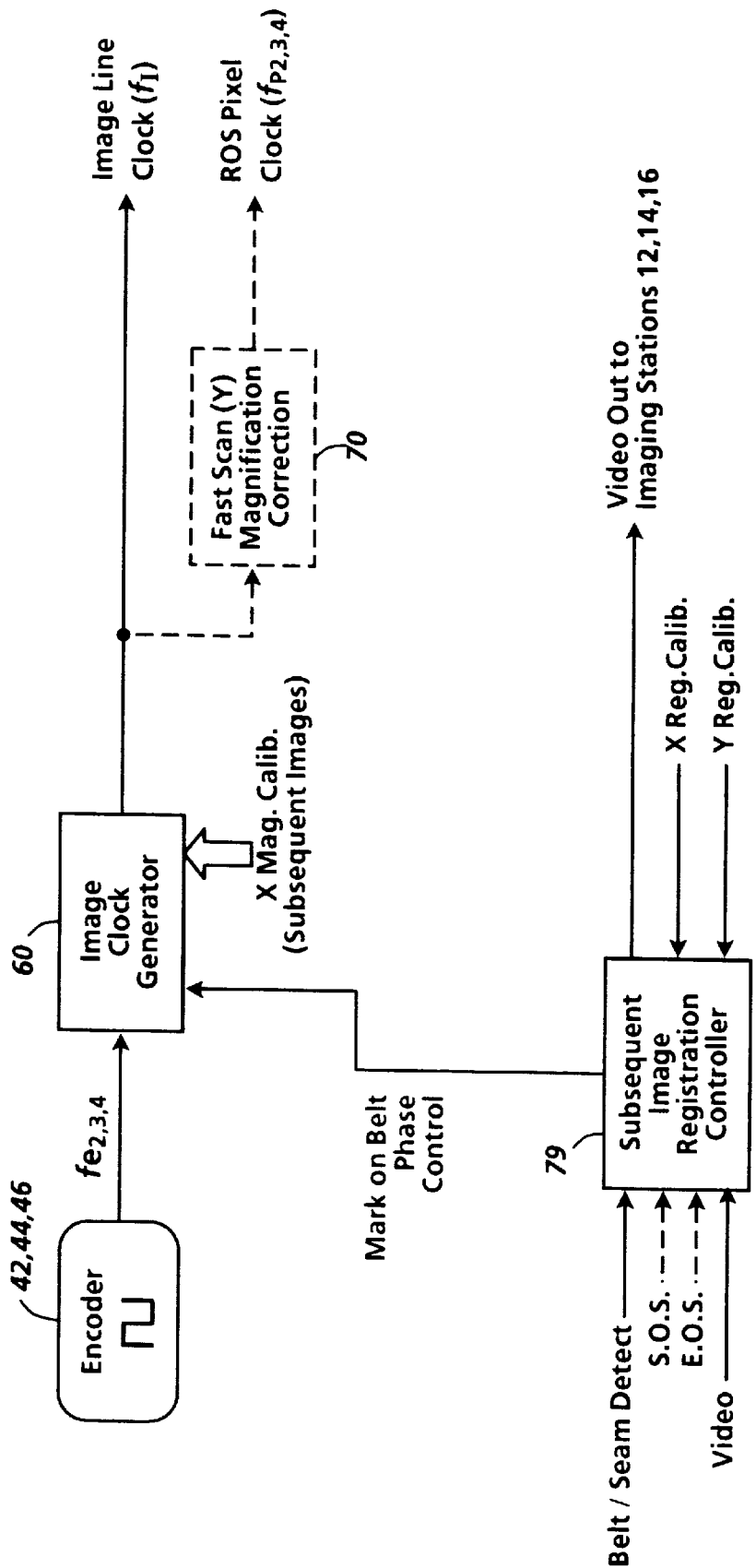
Figure 5:
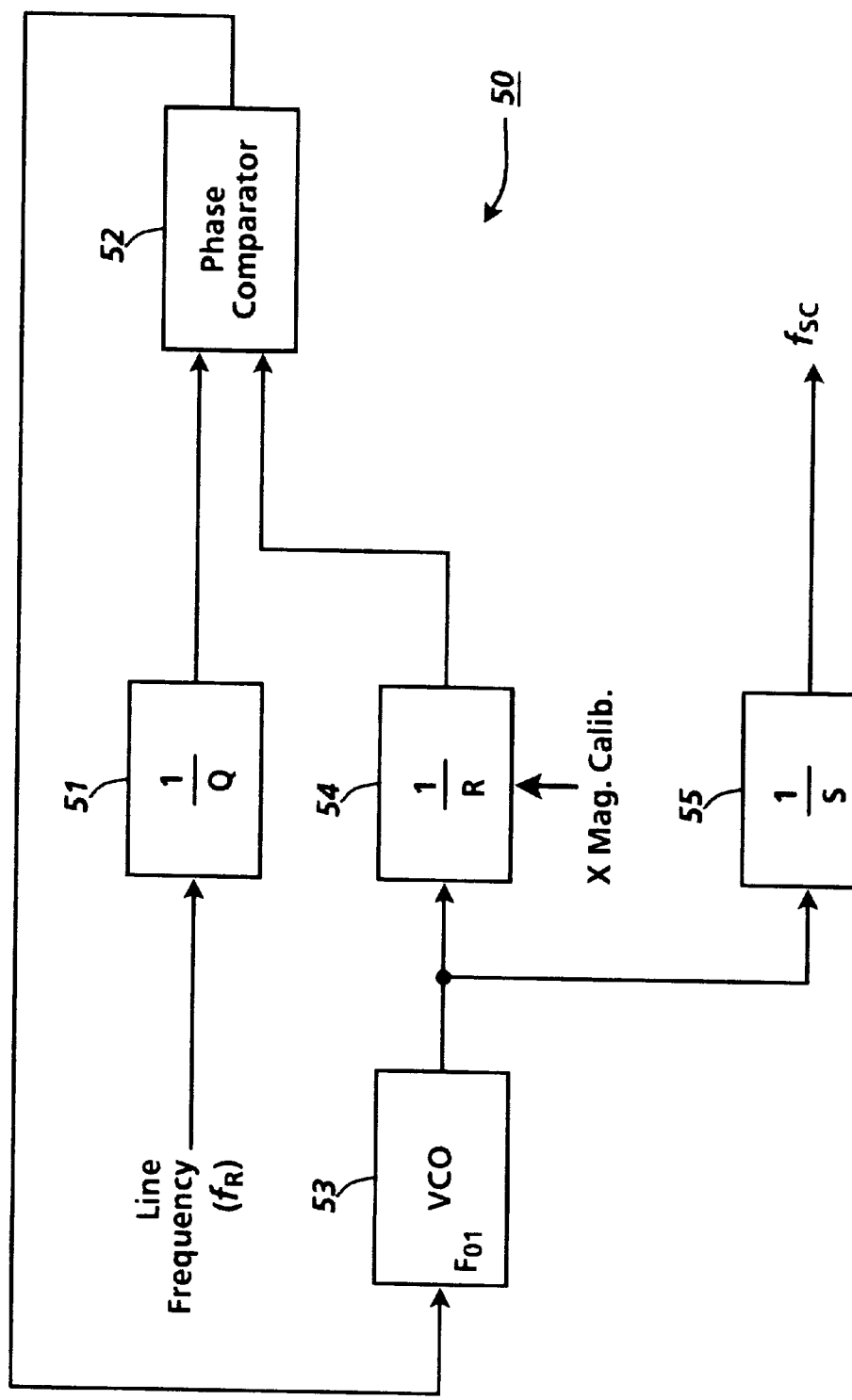
FIGS. 5–7 are detailed block diagrams of the control circuitry for the phase-locked loop control block depicted in FIGS. 3 and 4.
Figure 6:
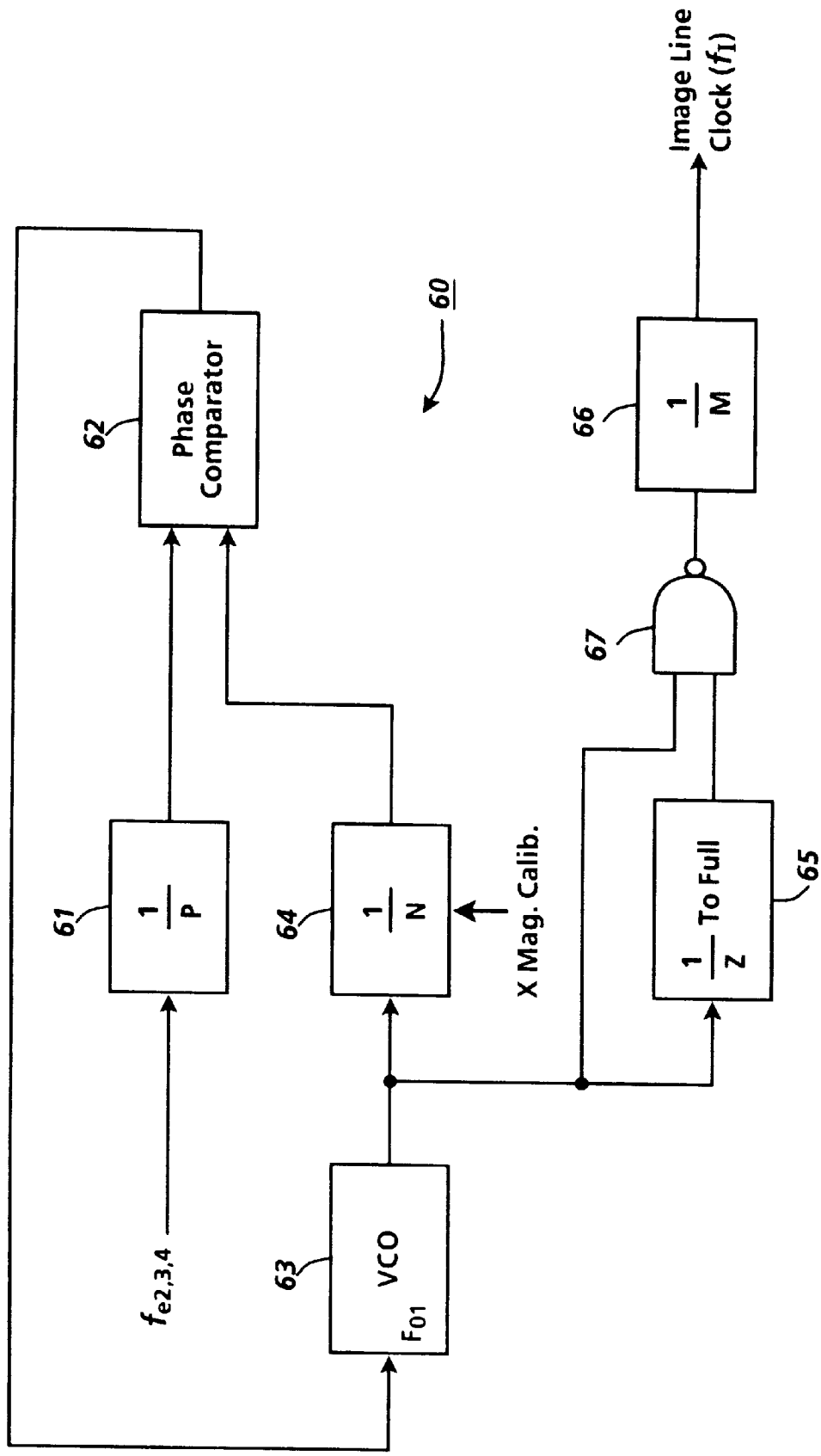
Figure 7:
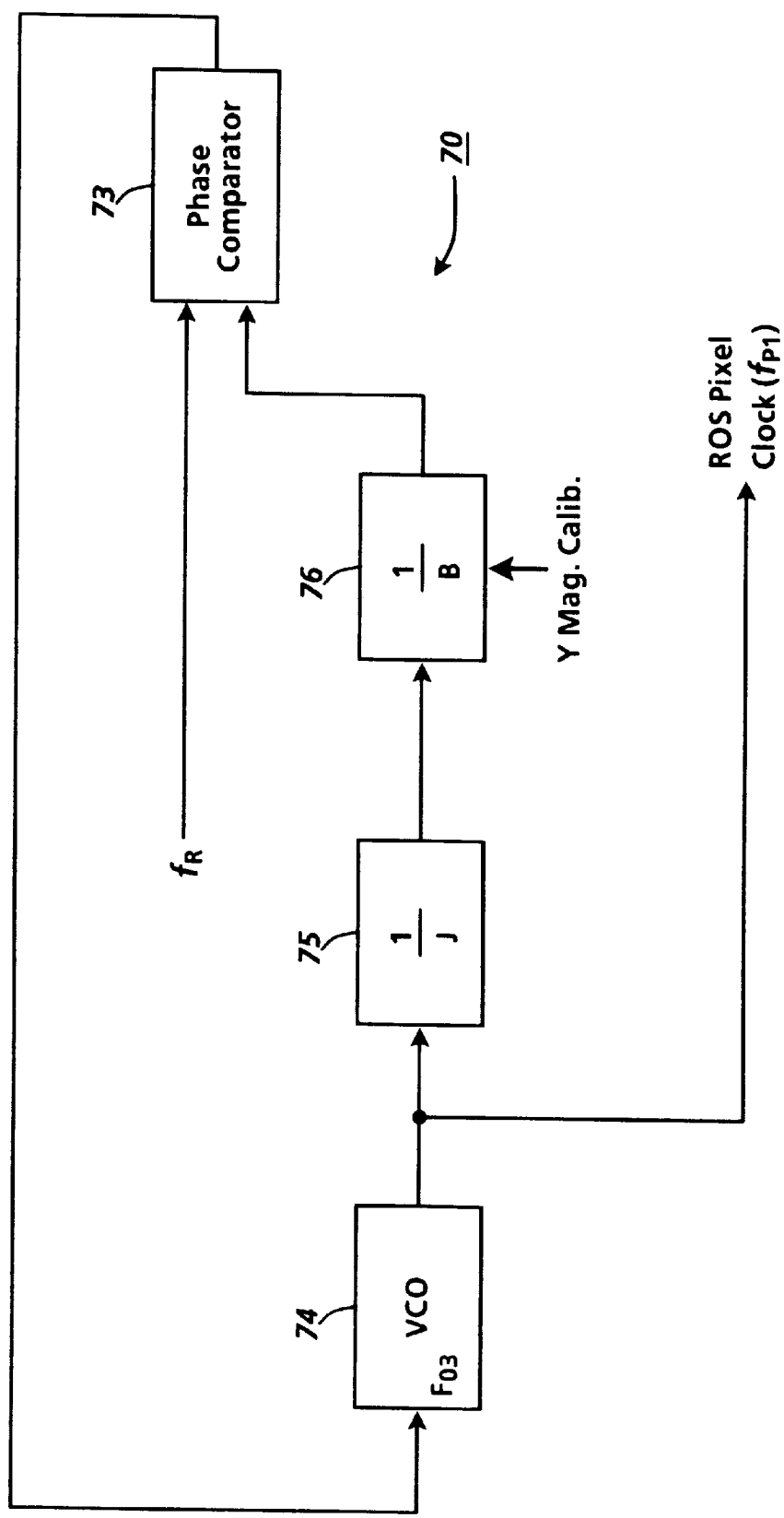

To accomplish the process direction registration of the color separations in an image-on-image color system (process color) the architecture generally illustrated by the block diagrams of FIGS. 3 and 4, and more particularly FIGS. 5 through 7, are employed. The basic components of the system are four interrelated phase locked loops, including a phase-locked loop that controls the photoreceptor velocity using a servomotor as previously described. Also included in the architecture, but not specifically illustrated in the overall block diagrams of FIGS. 3 and 4, are sensors for the start-of-scan (SOS), end-of-scan (EOS), photoreceptor belt seam, image/pitch detection, the input of which is noted to the image registration controllers 79.

Referring first to FIG. 3, where first imaging station (10) control architecture is depicted, the magnification correction phase-locked loop 50 takes a polygon servomotor clock $f_R$ and converts it into an appropriate frequency for the photoreceptor drive servomotor clock, $f_{SC}$ which is in turn provided to the the photoreceptor servomotor controller 51. There a phase-locked loop is used to synchronize the drive velocity of the photoreceptor (indicated by $f_{e1}$) to the scan or imaging rate of the first imaging station 10. The controller architecture of FIGS. 3 and 4 further illustrates a fast-scan (pixel clock) magnification phase-locked loop 70 (FIG. 7), which generates a pixel clock reference with a correctable relationship to the polygon drive servomotor clock for a ROS-based imaging system. Similarly, in FIG. 4, where the control architecture for subsequent imaging stations (12, 14, and 16) is illustrated, the image clock generator phase-locked loop 60 takes the respective encoder signals and generates an image line clock signal $f_I$, for driving the subsequent imaging stations in synchronization with the photoreceptor motion. In addition to the encoder input, image clock generator 60 also receives a mark detect signal from the image registration controller 79 to enable accurate phase synchronization between the images produced by each imaging station, as will be further described with respect to FIG. 6.

The phase-locked loop control architecture of FIGS. 3 through 7 will be further described with respect to a ROS-based imaging system, the unique elements of which have been illustrated in FIGS. 3 through 7 in a dashed-line format. In particular, while the video information, Video Out is indicated commonly as an output of the image registration controller 79, it will be understood that the image signals comprising the Video Out will be applied serially to the ROS-based imaging station, and in a parallel fashion to an LED-based imaging station. Exemplary parameters for such a multi-color printing system appear in Table 1, although many aspects thereof may be applicable to other exposure/imaging mechanisms as will be appreciated by one skilled in the art.

Referring to FIGS. 3 and 5, magnification block 50 generally receives as inputs, a ROS polygon servomotor clock signal ($f_R$) and an X magnification calibration "value" (R) and produces as an output, the photoreceptor drive servomotor clocking signal $f_{SC}$. The elements of the magnification correction phase-locked loop are further illustrated in FIG. 5, where the polygon servomotor clock signal $f_R$ is first divided at block 51

TABLE 1

| Parameter | Exemplary Value |
| --- | --- |
| X | 600 lines/inch |
| Y | 600 spots/inch |
| $P_{vel}$ | 10.23 inches/sec. (P/R Velocity) |
| J | 20 lines/polygon revolution |
| H | 0.125 revolutions/clock cycle |
| L | 12.00 inches |
| $F_P$ | 10 |
| $f_R$ | 2455.2 Hz |
| M | 10 |
| N | 1392 |
| P | 4 |
| Q | 4 |
| R | 2000 |
| B | 952 |
| Z | 200 | by a factor Q, the output of divisor block 51 being supplied to phase comparison block 52. A second input to the phase comparison block is provided by divider 54 which divides the frequency output by a voltage controlled oscillator (VCO) 53 by the X-direction magnification calibration factor, R, for the first imaging station (station 10 in FIGS. 1 and 2). Hence, VCO 53 is controlled so that its phase matches that of the polygon servomotor clock. The output of VCO 53 is also supplied to divider 55 where it is divided by a predefined divisor to produce the photoreceptor drive servomotor clock signal, $f_{SC}$.

Referring to FIGS. 4 and 6, image clock generator 60 utilizes an input signal representing photoreceptor motion, preferably an encoder signal ($f_e$), and a polygon-photoreceptor (P/R) line synchronization signal (mark on belt) to generate the image line clock signal, $f_I$. It is also noted that an image clock generator, as depicted in FIG. 6, is required for each color imaging station subsequent to the first. For example, the 4-color embodiment described herein would employ three image clock generators 60 to control each of the subsequent imaging stations (stations 12, 14, and 16 of FIGS. 1 and 2). Also, in an alternative embodiment, photoreceptor motion detection may be accomplished using a sensor for detecting marks or holes placed along an edge of the photoreceptor belt.

Referring specifically to FIG. 6, signal $f_e$ (from one of the encoders 42, 44, or 46) is input to divider 61 to produce an output signal for comparison at phase comparator 62. The second signal provided to phase comparator 62 is derived from voltage controlled oscillator (VCO) 63, as divided at block 64 by an X-direction magnification factor, N, where N is defined independently for each of the subsequent imaging stations. Hereagain, the phase comparator 62 produces a feedback signal that synchronizes the output of VCO 63 with the photoreceptor motion. The phase-locked output signal from VCO 63 is applied to block 65 and NAND gate 67 which, in combination, produce a signal that is subsequently divided by a predefined divisor M to generate image line clock signal $f_I$. More specifically, block 65 is a delay block (counter) responsive to the mark detect signal input thereto from image registration controller 79, so as to delay the output of the image line clock (via AND gate 67) for a predefined period. With respect to the phase-locked control architecture of FIGS. 3 through 7, it is important that the clock and feedback frequencies of the photoreceptor drive servomotor be identical (except when correcting velocity or phase/position errors).

Referring now to FIGS. 3 and 4 in conjunction with FIG. 6, the operation of the fast scan magnification correction phase-locked loop 70, required by a ROS-based imaging system, will be generally described. In particular, the fast scan magnification correction phase-locked loop 70 is a pixel clock reference phase-locked loop. In the phase-locked loop, the polygon servomotor clock signal $f_R$ is phase compared to the processed output of VCO 74 at phase comparator 73 so as to produce a feedback signal to control VCO 74. More specifically, the output of VCO 74 is passed through a pair of dividing blocks 75 and 76, where it is first divided by a predefined divisor J and subsequently divided by a programmable (per calibration operations) magnification factor B. The phase-locked output of VCO 74 then represents the pixel clock used to drive the imaging device, for example a laser diode in a ROS-based imaging system. The pixel clock reference signal $f_{P_1}$ output by phase-locked loop 70 may also be employed within the image registration controller 79 to produce as ROS line gate signal that could be required in a ROS-based system.

Figure 8:
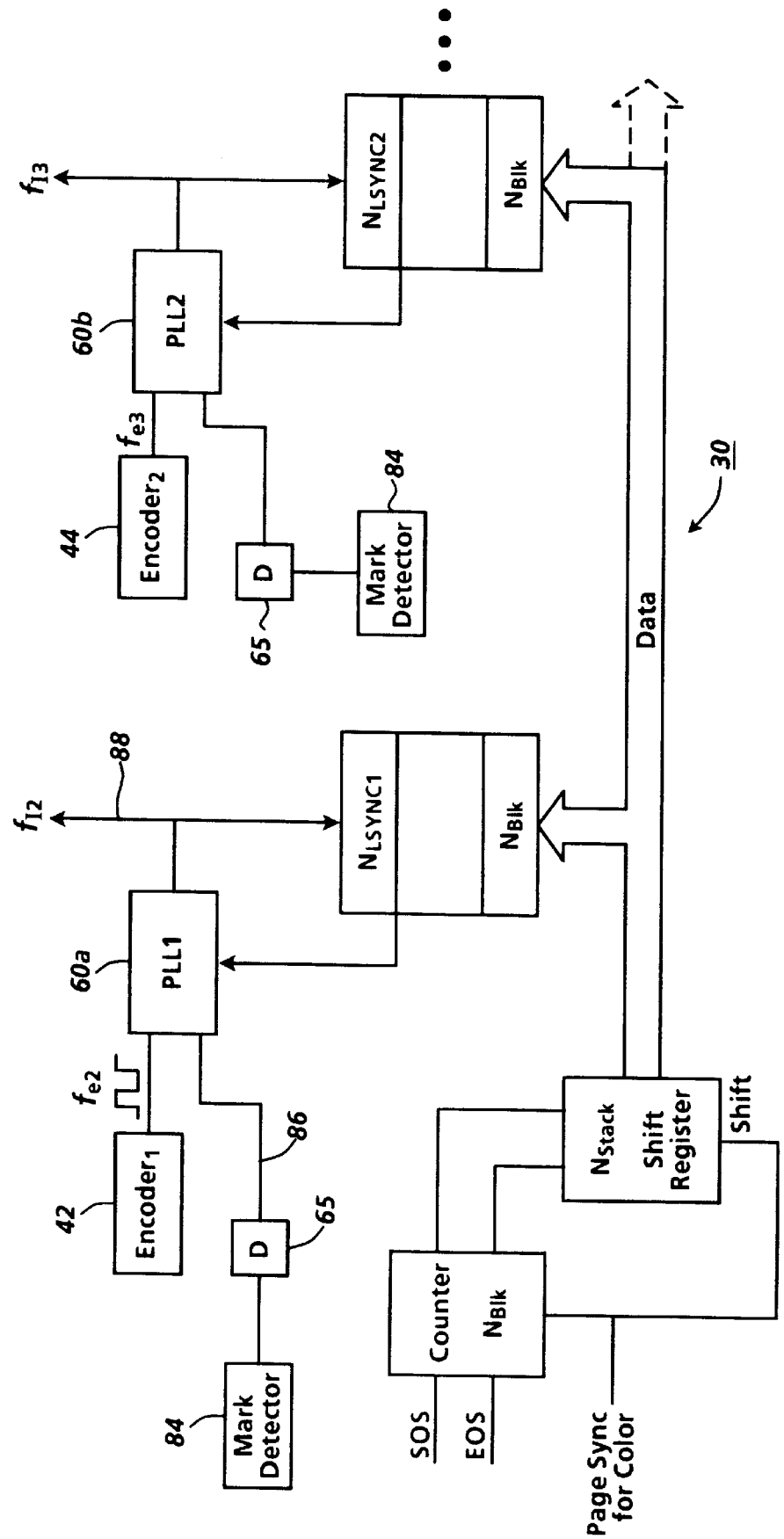
FIG. 8 is a schematic block diagram of the control circuitry for a two-color, single-pass printer in accordance with the present invention.

To accomplish phase-locked loop control of one or more color separation images subsequent to the initial image, the present invention specifically employs the interrelated architecture depicted in FIG. 8 for a ROS-based exposure system. Although FIG. 8 generally illustrates the generation of output signals (line syncs) for only two additional (subsequent) colors, it will be understood that additional color control signals may be achieved through the addition of circuitry similar in design to that illustrated. In one embodiment, ESS 30 may include the control circuitry, or the control circuitry may be separate from the video control operations of the ESS. The fast scan (y-direction) imaging rate, and phases, of subsequent imaging stations are synchronized to: (a) the velocity of the photoreceptor at the particular imaging station (12, 14 or 16), and (b) the starting point of the first image, as detected by mark detection sensors 84. The phase relationship is adjusted by setting the parameter Z (FIG. 6, block 65) to form a delay between the mark detection and the scan line clock.

As illustrated in FIG. 8, a first phase-locked loop (PLL1) 80 receives an input signal from a velocity sensing device such as encoder 42. In addition, an input signal is received from mark detect counter (D) 65. The mark detect counter 65 is a programmable, one-shot counter which may alternatively include an oscillator therein. Upon receipt of a pulsed signal from mark detector 84, mark detect counter 65 begins a predefinable delay before transmitting a synchronization signal to the first line synchronization phase-locked loop—to establish the registration of the second image $I_2$ as shown in FIG. 2.

Mark detector 84 may be any device suitable for detecting marks 34 and 35 placed on the surface of photoreceptor 18, for example, the detecting devices disclosed by de Jong et al. in U.S. Pat. No. 5,287,162 or by Charnitski et al. in U.S. Pat. No. 5,278,625, both of which are hereby incorporated by reference for their teachings. Mark detector 84, while not shown in FIGS. 1 or 2, should be placed at or near the point where the associated "receiving" imaging station (a station subsequent to the first imaging station, e.g., stations 12, 14, or 16 in FIG. 2) exposes the photoreceptor belt. As illustrated in FIG. 2, the marks to be detected are located in an interdocument zone between the image areas, preferably at a predefined distance before, and possibly after, the image area. The marks would be produced on the surface by exposure and development at the first imaging station. The separation distance between the mark 34 and the position of the first image raster created at the first imaging station would be fixed so as to enable the subsequent imaging stations to sense the mark and have a sufficient delay (defined by the mark detect counter) to begin imaging the subsequent color rasters in registration with the color rasters previously deposited on the photoreceptor.

Once the mark detect counter counts the predefined number of oscillations, subsequent to receiving the mark detect signal, it generates a "page" sync pulse on line 86 that is input to the phase-locked loop image clock generator (PLL1) 60a to enable the control process. Phase-locked loop 60a then processes the input signals as will be further described with respect to FIG. 9 to produce a line synchronization signal ($f_{12}$) on line 88. The second phase-locked loop (PLL2) 60b would operate in a similar fashion to control the output of a third imaging station by generating the second line sync signal ($f_{13}$) and so on.

Returning to FIGS. 3 through 7, the operation of an exemplary phase-locked loop 60 (*a, b*) will now be described in further detail. As previously noted, the image clock generation phase-locked loops control the generation of the line sync signals $f_I$ used to drive the respective imaging stations. In FIG. 6 specifically, the signal $f_e$ received from the encoder positioned at an associated imaging station is divided at divider block 61 by a divisor P. Furthermore, the value of the divisor M in block 66 is determined by the accuracy to which the line synchronization frequency is to be corrected. For example, if the line synchronization frequency is to be corrected to ±A %, then M must be greater than or equal to (100÷A).

The frequency of VCO 63 in FIG. 6 is determined by the following equation:

$$f_{vco} = M \times f_{L\,sync} \tag{2}$$

The output frequency of the encoder, $f_e$ is:

$$f_e = \left( \frac{\eta (\mathrm{cyc./rev.})}{\pi D (\mathrm{mm/rev})} \right) \times V_{P/R} (\mathrm{mm/sec.}) \tag{3}$$

where η is the encoder pitch in cycles/revolution. Using the equivalency relationship:

$$\frac{f_{VCO}}{N} \equiv \frac{f_e}{P} \tag{4}$$

the value of P or N may be determined to obtain a frequency that is capable of being processed by the phase comparator 62. In a phase locked situation, the frequencies of the signals produced by dividers 61 and 64 would match. In normal operation, phase comparator 62 generates a voltage signal as a function of the difference in phase between the input frequencies from dividers 61 and 64 In turn, the frequency of the voltage controlled oscillator is adjusted so that a phase match is obtained. In addition, the high frequency signal output by the voltage controlled oscillator is also directed to another divider 66. Divider 66 divides the oscillating signal output by VCO 63 by digitally controlled divisor M so that the scan line frequency at this imaging station precisely matches the scanline frequency of the preceding imaging stations. As a result, the line synch signal frequency ($f_l$) may be represented as:

$$f_l = \frac{N \times f_e}{P \times M} \quad (5)$$

Assuming the value of M is a programmable divisor, having a range of from 0–4000, the raster line frequency may be set/adjusted in increments of 0.0025 percent of the voltage control oscillator frequency ($f_{VCO}$).

The operation of the phase-locked loop architecture employed in the present invention, and described above with respect to the figures, may be summarized as follows. Initially, the speed of the photoreceptor belt is sensed as it passes first imaging station 10 where encoder 40 produces an electrical signal representative thereof. Concurrently, as a function of the electrical signal and a signal representing the fixed line frequency of the first color imaging station ($f_0$), a servomotor drive signal is generated to drive the photoreceptor belt in synchronization with the production of a first transferable image at imaging station 10. At at least one imaging station, located downstream (x-direction) of the first imaging station in the process direction, a second transferable image is produced on the surface of the photoreceptor belt in registration with the first transferable image. The second image is comprised of rasterized lines produced in response to a scanline clock signal provided to the secondary imaging station. The line sync signal, at a frequency $f_l$, is created as a function of the speed of the photoreceptor at the secondary imaging station and a signal representing the fixed line frequency $f_R$. Again, the speed of the photoreceptor is monitored or sensed by a second encoder positioned in close proximity to the secondary imaging station which generates a second electrical signal indicative of the speed; the second electrical signal being applied as an input to the image clock generating circuitry described above. The line synch signal generated by the image clock generator results in rasterized lines of the second image on the member being produced and deposited on the photoreceptor belt in registration with the rasterized lines of the first image.

Described next will be the general operations necessary to set up the aforedescribed phase-locked loop controller in a multicolor printing system. The operation of the black or first imaging station 10 in FIG. 1 is controlled with respect to the frequency of the line sync signal $f_R$ used to drive the imaging station, for example, the ROS polygon or LED array, as previously described. The scanline pitch (first image station line frequency $f_R$) is a constant and the photoreceptor velocity is servo controlled to yield the desired scan line resolution in the process direction (y-direction). In operation, the imaging station produces a black page synchronization line 34 (FIG. 2) at a location preceding the leading edge of the first or black image, and a second line 35 at a fixed distance following the trailing edge of the image. The position of the second line is determined as a function of a fixed number of encoder pulses output by encoder 40, located beneath the first imaging station. Preferably, the number of line sync pulses generated between the deposition of lines 34 and 35 is counted and compared against a predicted number of lines for the desired resolution. Depending upon the amount and direction of deviation between the actual and predicted number of line sync pulses, the nominal speed of the photoreceptor servomotor is adjusted. The number of line sync pulses is provided to subsequent imaging stations as well. A service representative monitoring the system then makes a one-time adjustment of the value used for R, a divisor described above, to "zero-out" any geometry errors in the encoder system wheel for the first color imaging station. More specifically, the service representative would print the stored electronic document page and measure the locations of marks thereon to determine the appropriate settings for the R divisor value. In a similar fashion, for a ROS-based system, the y-direction magnification for the first imaging station is adjusted by altering the value of the B in block 76 of FIG. 7. It will be appreciated that while such adjustments may be accomplished automatically such a system may be prohibitively expensive for many applications.

Upon completion of the set-up procedure for the first or primary imaging station, a similar procedure is executed for the subsequent imaging stations, herein described as the subsequent imaging station. In particular, the steps of the procedure for setting up subsequent colors are as follow:

(a) a standardized, electronically stored image is printed for a first color separation only;

(b) Magnification setup
  (i) the pixel clock of the subsequent imaging station is adjusted by altering the magnification divisor B (divider 76 of FIG. 7) to produce the correct y-direction (cross-scan) magnification (applicable to ROS-based systems only as an LED array would have a fixed y-direction magnification that is controlled optically), and
  (ii) the value of N is set to a level that results in the desired x-direction (process) magnification;

(c) the standardized electronic image is then printed with the first and second colors (separations);

(d) the values for M and S for the second imaging station are then adjusted to produce the correct relationship between the first and second colors separations, where the value of M is adjusted to produce the correct x-direction magnification and the value of S is adjusted to produce the desired color-to-color spacing within the image; and (e) steps (c) and (d) are then repeated for all subsequent imaging stations.

In the phase-locked loop configuration previously described with respect to FIGS. 4 and 6, the phase-locked image clock generator maintains the desired line synchronization based upon the speed of the photoreceptor, compensating for any variations in the speed. Hence, the generation of the line sync signals ($f_l$) is accomplished as a function of the pulsed encoder output of a secondary imaging station encoder, for example, encoder 42. Accordingly, the present system maintains the correct registration and spacing of the raster lines at each subsequent imaging station regardless of the photoreceptor velocity.

In recapitulation, the present invention is a method and apparatus for modifying line synchronization control signals which drive a secondary image exposure device in a multicolor printing or reprographic system. The ability to alter the line synchronization signals enables the accurate registration of multiple color images on a photoconductor in response to detected photoreceptor motion error as determined by monitoring the photoreceptor movement More specifically, the first color image is deposited on the photoreceptor using a servomotor control system to control photoreceptor velocity. All subsequently added colors in the single-pass printing system are added under the control of image timing signals generated by phase-locked loops, wherein the raster line synchronization pulses are produced as a function of the photoreceptor speed and the predefined line resolution.

It is, therefore, apparent that there has been provided, in accordance with the present invention, a method and apparatus for employing a phase-locked loop controller to control signals which drive a secondary image exposure device in a multicolor printing or reprographic system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A multiple-image registration apparatus in a printing system having a plurality of imaging stations, each outputting a transferable image on a moving member, for synchronizing output of the plurality of imaging stations with respect to the member moving relative to the imaging stations, comprising:

a servomotor for driving the member;

a first imaging station, located along a periphery of the member, for producing a first transferable image on a surface of the member by creating a latent image on the member and subsequently developing the latent image thereon, said first imaging station producing rasterized lines of the first transferable image at a fixed line frequency on the surface of the member in response to data of a first color separation;

a first velocity sensing means, positioned adjacent the first imaging station and in contact with the member, for sensing the velocity of the member as it passes said first imaging station and producing an electrical signal representative of the velocity of the member as it passes said first imaging station;

a first phase-locked loop controller for receiving the electrical signal from the first encoder and a signal representing the fixed line frequency, said first phase-locked loop creating a servomotor drive signal as a function of the electrical signal and fixed frequency signal so as to cause the servomotor to drive the member in synchronization with said first imaging station;

a second imaging station, located along the periphery of the member downstream from said first imaging station, for producing a second transferable image on the member, said second imaging station producing rasterized lines of the second image in response to a second scanline clock signal;

a second velocity sensing means, positioned adjacent the second imaging station and in contact with the member, for sensing the velocity of the member as it passes said second imaging station and producing a second electrical signal representative of the velocity of the member as it passes said second imaging station; and a second phase-locked loop controller for receiving the second electrical signal and creating the second scanline clock signal as a function of the second electrical signal so as to cause the second imaging station to produce rasterized lines of the second transferable image on the member in registration with the rasterized lines of the first transferable image in response to data of a second color separation.

2. The multiple-image registration apparatus of claim 1, further comprising:

a mark detector, positioned along a periphery of the photoresponsive member between the first and second imaging stations, for generating a mark detection signal upon detection of a mark placed on the surface of the member by said first imaging station;

a mark detect counter, responsive to the mark detection signal, for delaying the output of the second imaging station for a predetermined period subsequent to receiving the mark detection signal so as to produce the second transferable image on the surface of the member in registration with the rasterized lines of the first transferable image.

3. The multiple-image registration apparatus of claim 1, further comprising:

a third imaging station, located along the periphery of the member downstream from said second imaging station, for producing a third transferable image on the member, said third imaging station producing rasterized lines of the third image in response to a third scanline clock signal;

a third velocity sensing means, positioned adjacent the third imaging station and in contact with the member, for sensing the velocity of the member as it passes said third imaging station and producing a third electrical signal representative of the velocity of the member as it passes said third imaging station; and a third phase-locked loop controller for receiving the third electrical signal and creating the scanline clock signal as a function of the third electrical signal so as to cause the third imaging station to produce rasterized lines of the third image on the member in registration with the rasterized lines of the first transferable image and the second transferable image.

4. The multiple-image registration apparatus of claim 3, further comprising:

a second mark detector, positioned along a periphery of the photoresponsive member between the first and third imaging stations, for generating a mark detection signal upon detection of a mark placed on the surface of the member by said first imaging station in an interdocument zone;

a second mark detect counter, responsive to the mark detection signal, for delaying output of the third imaging station for a predefined time period subsequent to receiving the mark detection signal so as to produce the third image on the surface of the member in registration with the rasterized lines of the first transferable image and the second transferable image.

5. The multiple-image registration apparatus of claim 1, wherein the first transferable image and second transferable image are of different color separations.

6. The multiple-image registration apparatus of claim 1, wherein said first imaging station and said second imaging station each comprise a raster output scanner, including:

a laser light source for producing a light beam that is modulated in response to color separation data; and a rotating polygon for reflecting the modulated light beam to produce a scan line that is focused in the linear direction at the surface of the member.

7. The multiple-image registration apparatus of claim 1, wherein said first imaging station and said second imaging station each include:

a light-emitting diode print bar for producing light output in response to color separation data; and, a gradient index lens, optically associated with said light-emitting diode print bar, to couple light emitted from at least a single diode in said light emitting diode print bar to the surface of the member.

8. The multiple-image registration apparatus of claim 1, wherein said first velocity sensing means and said second velocity sensing means are each selected from the group consisting of:

an optical disk encoder;

a laser doppler velocimeter; and a magnetic encoder.

9. A method for synchronizing output of a plurality of imaging stations in a single-pass, multi-color printing system comprising the steps of:

driving, with a servomotor, a photoresponsive member in a process direction relative to the plurality imaging stations;

producing, at a first imaging station, located along a periphery of the photoresponsive member, a first transferable image on a surface of the photoresponsive member, the first transferable image comprising rasterized lines at a fixed frequency;

sensing a speed of the photoresponsive member as it passes the first imaging station and producing an electrical signal representative of the speed of the member as it passes the first imaging station;

creating, as a function of the electrical signal and a signal representing the fixed frequency, a servomotor drive signal to drive the photoresponsive member in synchronization with rasterized lines of the first transferable image produced at the first imaging station;

producing, at a second imaging station located along the periphery of the photoresponsive member and spaced apart from said first imaging station in a process direction, a second transferable image on the surface of the photoresponsive member, the second image comprising rasterized lines produced in response to a scanline clock signal;

sensing the speed of the photoresponsive member as it passes the second imaging station and producing a second electrical signal representative of the speed of the member as it passes the second imaging station; and creating the scanline clock signal as a function of the second electrical signal to synchronize the second imaging station to produce rasterized lines of the second image on the photoresponsive member in registration with the rasterized lines of the first image.

10. The method of claim 9, further comprising the steps of:

producing, at the first imaging station, a mark in an interdocument zone on the surface of the photoresponsive member at a fixed distance from the first transferable image;

detecting the mark with a mark detector located along a periphery of the member between the first and second imaging stations and in proximity to the second imaging station;

generating a mark detection signal upon detection of the mark placed on the surface of the member by said first imaging station; and in response to the mark detection signal, delaying production of the second transferable image by the second imaging station for a predetermined period subsequent to detecting the mark so as to produce the second image on the surface of the photoresponsive member in registration with the rasterized lines of the first image.

11. The method of claim 9, further comprising the steps of:

producing, at a third imaging station located along the periphery of the photoresponsive member and spaced apart from the first imaging station and the second imaging station in the process direction, a third transferable image on the surface of the photoresponsive member, the third image comprising rasterized lines produced in response to a second scanline clock signal;

sensing the speed of the photoresponsive member as it passes the third imaging station and producing a third electrical signal representative of the speed of the photoresponsive member as it passes the third imaging station; and creating the second scanline clock signal as a function of the third electrical signal to synchronize the third imaging station to produce rasterized lines of the third image on the photoresponsive member in registration with the rasterized lines of the first transferable image and the second transferable image.

12. A multi-color printing machine having a movable recording member, including:

a first imaging station, located along a periphery of the recording member, for producing a first transferable image on a surface of the recording member, said first imaging station producing rasterized lines of the first image at a fixed line frequency on the surface of the recording member;

a servomotor for driving the recording member;

a first encoder, positioned adjacent the first imaging station and in contact with an opposite surface of the recording member, for sensing a speed of the recording member as it passes said first imaging station and producing an electrical signal representative of the speed of the recording member as it passes said first imaging station;

a first phase-locked loop controller for receiving the electrical signal from the first encoder and a signal representing the fixed line frequency, and creating therefrom a servomotor drive signal as a function of the electrical signal and the fixed frequency signal so as to control a rotational speed of the servomotor and thereby drive the recording member in synchronization with said first imaging station;

a second imaging station, located along the periphery of the recording member yet spaced apart from said first imaging station along a direction of travel of the recording member, for producing a second transferable image on the recording member, said second imaging station producing rasterized lines of the second image in response to a scanline clock signal;

a second encoder, positioned adjacent the second imaging station and in contact with the opposite surface of the recording member, for sensing the speed of the recording member as it passes said second imaging station and producing a second electrical signal representative of the speed of the recording member as it passes said second imaging station;

a mark detector, positioned along a periphery of the photoresponsive member between the first and second imaging stations, for generating a mark detection signal upon detection of a mark placed on the surface of the member by said first imaging station;

a second phase-locked loop controller for receiving the second electrical signal and creating the scanline clock signal as a function of the second electrical signal and the fixed frequency signal so as to cause the second imaging station to produce rasterized lines of the second image on the recording member at a spatial separation equal to that of the rasterized lines of the first image; and a mark detect counter, responsive to the mark detection signal, for delaying the output of the second imaging station for a predetermined period subsequent to receiving the mark detection signal so as to produce the second image on the surface of the member in registration with the rasterized lines of the first image.

13. The multiple-image registration apparatus of claim 12, wherein the first transferable image and the second transferable image are of different color separations.

14. The multiple-image registration apparatus of claim 12, wherein said first and second imaging stations each comprise a raster output scanner, including:

a laser light source for producing a light beam that is modulated in response to color separation data; and a rotating polygon for reflecting the modulated light beam to produce a scan line that is focused in the linear direction at the surface of the member.

15. The multiple-image registration apparatus of claim 12, wherein said first imaging station and said second imaging station each include:

a light-emitting diode print bar for producing light output in response to color separation data; and, a gradient index lens, optically associated with said light-emitting diode print bar, to couple light emitted from at least a single diode in said light emitting diode print bar to the surface of the member.

* * * * *